United States Patent
Blaney et al.

(10) Patent No.: US 10,961,866 B2
(45) Date of Patent: Mar. 30, 2021

(54) ATTACHMENT BLOCK FOR BLADE OUTER AIR SEAL PROVIDING IMPINGEMENT COOLING

(71) Applicant: United Technologies Corporation, Farmington, CT (US)

(72) Inventors: Ken F. Blaney, Middleton, NH (US); Thomas E. Clark, Sanford, ME (US)

(73) Assignee: Raytheon Technologies Corporation, Waltham, MA (US)

( * ) Notice: Subject to any disclaimer, the term of this patent is extended or adjusted under 35 U.S.C. 154(b) by 193 days.

(21) Appl. No.: 16/042,066

(22) Filed: Jul. 23, 2018

(65) Prior Publication Data
US 2020/0025028 A1    Jan. 23, 2020

(51) Int. Cl.
*F01D 25/14* (2006.01)
*F01D 11/12* (2006.01)
(Continued)

(52) U.S. Cl.
CPC ............... *F01D 25/14* (2013.01); *F01D 9/04* (2013.01); *F01D 11/08* (2013.01); *F01D 11/12* (2013.01);
(Continued)

(58) Field of Classification Search
CPC .......... F01D 5/225; F01D 9/04; F01D 9/041; F01D 9/06; F01D 9/065; F01D 11/001;
(Continued)

(56) References Cited

U.S. PATENT DOCUMENTS

| 4,679,981 A | 7/1987 | Guibert et al. |
| 5,758,653 A | 6/1998 | Schotland |

(Continued)

FOREIGN PATENT DOCUMENTS

| EP | 1676981 A2 | 7/2006 |
| EP | 1965033 A2 | 9/2008 |
| GB | 2244523 A | 12/1991 |

OTHER PUBLICATIONS

European Search Report for EP Application No. 19187958.4 dated Jan. 8, 2020.

(Continued)

*Primary Examiner* — Nathaniel E Wiehe
*Assistant Examiner* — Danielle M. Christensen
(74) *Attorney, Agent, or Firm* — Carlson, Gaskey & Olds, P.C.

(57) ABSTRACT

A gas turbine engine includes a compressor section and a turbine section. The turbine section includes at least one turbine rotor having a radially extending turbine blade. The turbine section is rotatable about an axis of rotation. A blade outer air seal is positioned radially outwardly of a radially outer tip of the at least one turbine blade. The blade outer air seal has axially spaced forward and aft portions and a central web between the axially spaced portions. An attachment block is supported on structure within the engine. The attachment block mounts the blade outer air seal. A passage extends into a central chamber within the attachment block, and communicates with cooling holes through a radially inner face of the attachment block to direct cooling air at the central web of the blade outer air seal. A blade outer air seal is also disclosed.

15 Claims, 3 Drawing Sheets

(51) Int. Cl.
  *F01D 25/12* (2006.01)
  *F01D 11/08* (2006.01)
  *F01D 9/04* (2006.01)

(52) U.S. Cl.
  CPC .......... *F01D 25/12* (2013.01); *F05D 2240/11* (2013.01); *F05D 2240/55* (2013.01); *F05D 2260/201* (2013.01); *F05D 2300/6033* (2013.01)

(58) Field of Classification Search
  CPC ........ F01D 11/005; F01D 11/08; F01D 11/12; F01D 11/122; F01D 11/127; F01D 25/12; F01D 25/14; F01D 25/24; F01D 25/243; F01D 25/246; F05D 2240/11; F05D 2240/126; F05D 2240/55; F05D 2240/80; F05D 2240/81; F05D 2240/90; F05D 2240/91; F05D 2260/201
  See application file for complete search history.

(56) References Cited

U.S. PATENT DOCUMENTS

| | | | |
|---|---|---|---|
| 6,758,653 B2 * | 7/2004 | Morrison | F01D 9/04 415/116 |
| 8,147,192 B2 * | 4/2012 | Jones | F01D 11/24 415/173.1 |
| 8,246,299 B2 | 8/2012 | Razzell et al. | |
| 8,303,247 B2 * | 11/2012 | Schlichting | F01D 11/122 29/424 |
| 8,814,507 B1 | 8/2014 | Campbell et al. | |
| 9,938,846 B2 | 4/2018 | Freeman et al. | |
| 10,443,425 B2 * | 10/2019 | Romanov | B22C 9/10 |
| 10,487,678 B2 * | 11/2019 | Tyler, Jr. | F01D 11/005 |
| 2009/0155051 A1 | 6/2009 | Lee et al. | |
| 2014/0023490 A1 | 1/2014 | Hillier | |
| 2016/0333784 A1 | 11/2016 | Jones et al. | |
| 2016/0348526 A1 | 12/2016 | Vetters et al. | |
| 2017/0145845 A1 | 5/2017 | Vetters et al. | |
| 2017/0175572 A1 | 6/2017 | Vetters | |
| 2018/0073391 A1 | 3/2018 | Jennings | |
| 2018/0087405 A1 | 3/2018 | Quennehen et al. | |

OTHER PUBLICATIONS

European Search Report for EP Application No. 19187956.8 dated Apr. 1, 2020.

* cited by examiner

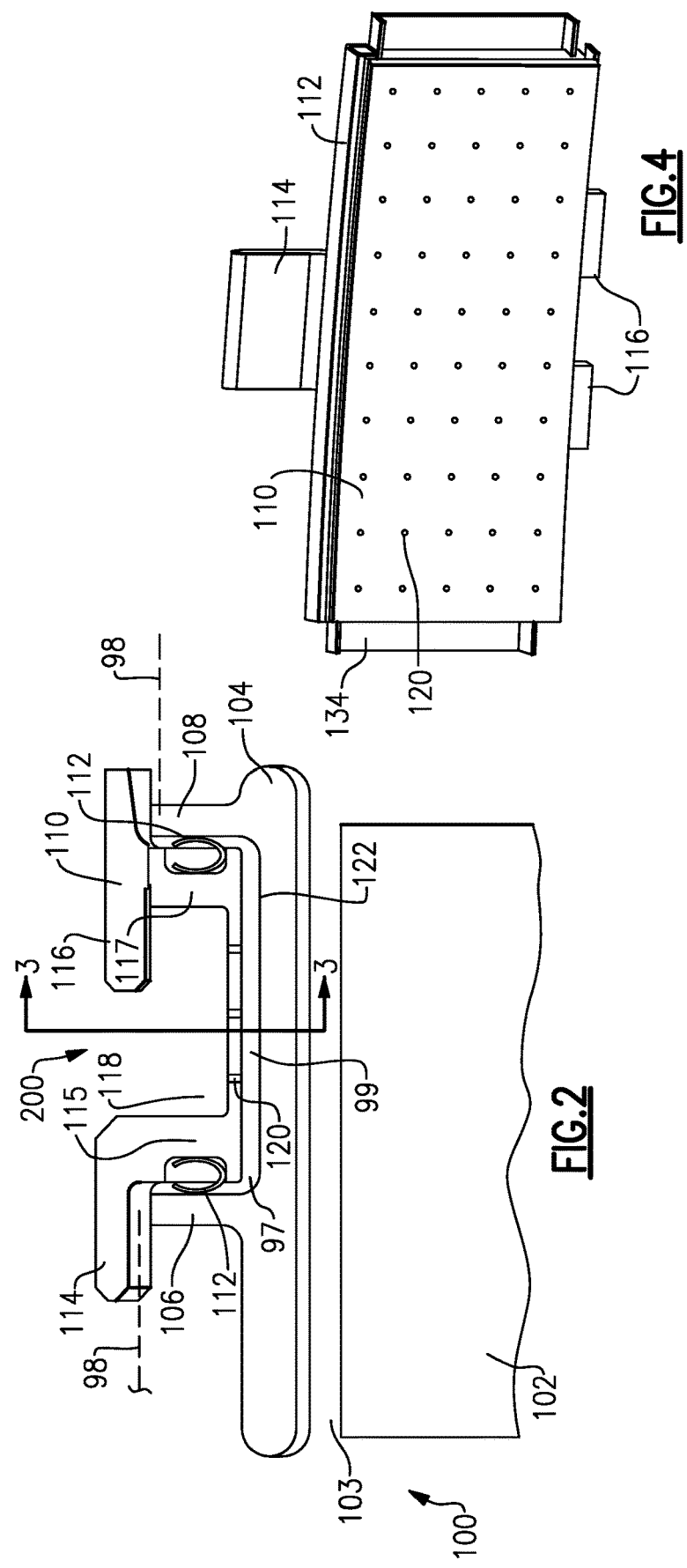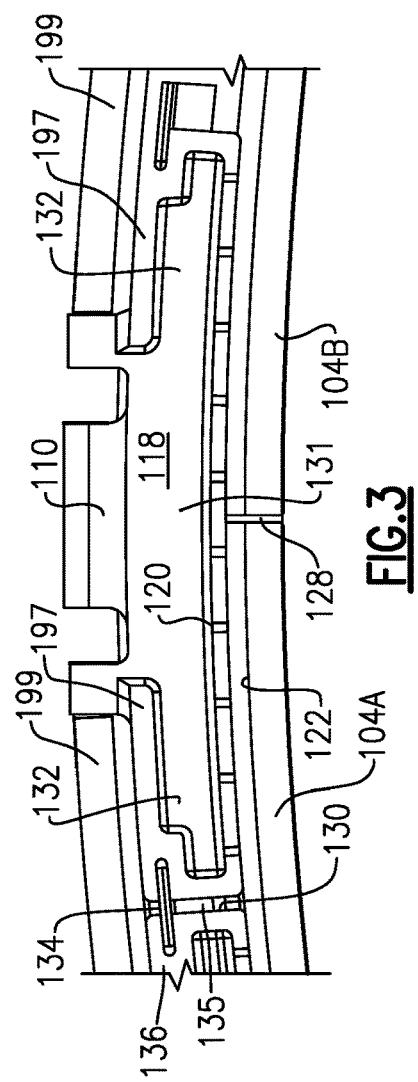

ATTACHMENT BLOCK FOR BLADE OUTER AIR SEAL PROVIDING IMPINGEMENT COOLING

BACKGROUND

This application relates to an attachment block for a blade outer air seal which provides impingement cooling.

Gas turbine engines are known and generally include a fan delivering air into a bypass duct as propulsion air. Air is also delivered into a compressor where it is compressed and delivered into a combustions section. In the combustion section, the compressed air is mixed with fuel and ignited.

Products of this combustion pass downstream over turbine rotors, driving them to rotate. The turbine rotors generally include turbine blades which are impacted by the products of combustion to drive the turbine blades and, hence, the rotors.

The efficiency of gas turbine engines is an area of much design effort. It is desirable that as much of the products of combustion as possible be guided across the turbine blades.

Thus, it is known to provide blade outer air seals ("BOAS") spaced radially outwardly of a radially outer tip of the turbine blades. This minimizes leakage.

SUMMARY

In a featured embodiment, a gas turbine engine includes a compressor section and a turbine section. The turbine section includes at least one turbine rotor having a radially extending turbine blade. The turbine section is rotatable about an axis of rotation. A blade outer air seal is positioned radially outwardly of a radially outer tip of the at least one turbine blade. The blade outer air seal has axially spaced forward and aft portions and a central web between the axially spaced portions. An attachment block is supported on structure within the engine. The attachment block mounts the blade outer air seal. A passage extends into a central chamber within the attachment block, and communicates with cooling holes through a radially inner face of the attachment block to direct cooling air at the central web of the blade outer air seal.

In another embodiment according to the previous embodiment, the central chamber includes circumferentially extending fingers communicating with the passage, such that air may pass into the passage, and then circumferentially into the circumferentially extending fingers, and then through the cooling holes to impinge on the central web.

In another embodiment according to any of the previous embodiments, there are a plurality of circumferentially spaced blade outer air seals and a plurality of circumferentially spaced attachment blocks.

In another embodiment according to any of the previous embodiments, cooling air after being directed at the central web of the blade outer air seal, passes radially inwardly through circumferential gaps between adjacent ones of the blade outer air seals.

In another embodiment according to any of the previous embodiments, the attachment blocks have circumferential edges, and a gap seal spans a circumferential gap between the circumferential edges of adjacent ones of the attachment blocks.

In another embodiment according to any of the previous embodiments, there are axial seals associated with a forward end and an aft end of the attachment block, and seal against a forward and aft surface of the blade outer air seal.

In another embodiment according to any of the previous embodiments, the axial seals at the forward and aft end of the attachment block are generally C-shaped.

In another embodiment according to any of the previous embodiments, the gap seals span the circumferential gap between adjacent ones of the attachment blocks are feather seals.

In another embodiment according to any of the previous embodiments, the cooling holes also are formed at locations circumferentially outwardly of hook portions on the attachment blocks.

In another embodiment according to any of the previous embodiments, the attachment block hook portions include a single forward attachment hook and a plurality of aft attachment hooks.

In another featured embodiment, a blade outer air seal assembly includes a blade outer air seal having axially spaced forward and aft portions and a central web between the axially spaced portions. An attachment block is supported on structure within an engine. The attachment block mounts the blade outer air seal. A passage extends into a central chamber within the attachment block, and communicates with cooling holes through a radially inner face of the attachment block to direct cooling air at the central web of the blade outer air seal.

In another embodiment according to the previous embodiment, the central chamber includes circumferentially extending fingers communicating with the passage, such that air may pass into the passage, and then circumferentially into the circumferentially extending fingers, and then through the cooling holes to impinge on the central web.

In another embodiment according to any of the previous embodiments, there are a plurality of circumferentially spaced blade outer air seals and a plurality of circumferentially spaced attachment blocks.

In another embodiment according to any of the previous embodiments, cooling air after being directed at the central web of the blade outer air seal, passes radially inwardly through circumferential gaps between adjacent ones of the blade outer air seals.

In another embodiment according to any of the previous embodiments, the attachment blocks have circumferential edges, and a gap seal spans a circumferential gap between the circumferential edges of adjacent ones of the attachment blocks.

In another embodiment according to any of the previous embodiments, there are axial seals associated with a forward end and an aft end of the attachment block, and seal against a forward and aft surface of the blade outer air seal.

In another embodiment according to any of the previous embodiments, the axial seals at the forward and aft end of the attachment block are generally C-shaped.

In another embodiment according to any of the previous embodiments, the gap seals span the circumferential gap between adjacent ones of the attachment blocks are feather seals.

In another embodiment according to any of the previous embodiments, the cooling holes also are formed at locations circumferentially outwardly of hook portions on the attachment blocks.

In another embodiment according to any of the previous embodiments, the attachment block hook portions include a single forward attachment hook and a plurality of aft attachment hooks.

These and other features may be best understood from the following drawings and specification.

BRIEF DESCRIPTION OF THE DRAWINGS

FIG. 2 shows a portion of a turbine section.
FIG. 3 shows details of the FIG. 2 structure along line 3-3.
FIG. 4 shows an attachment block.

DETAILED DESCRIPTION

Figure 1:
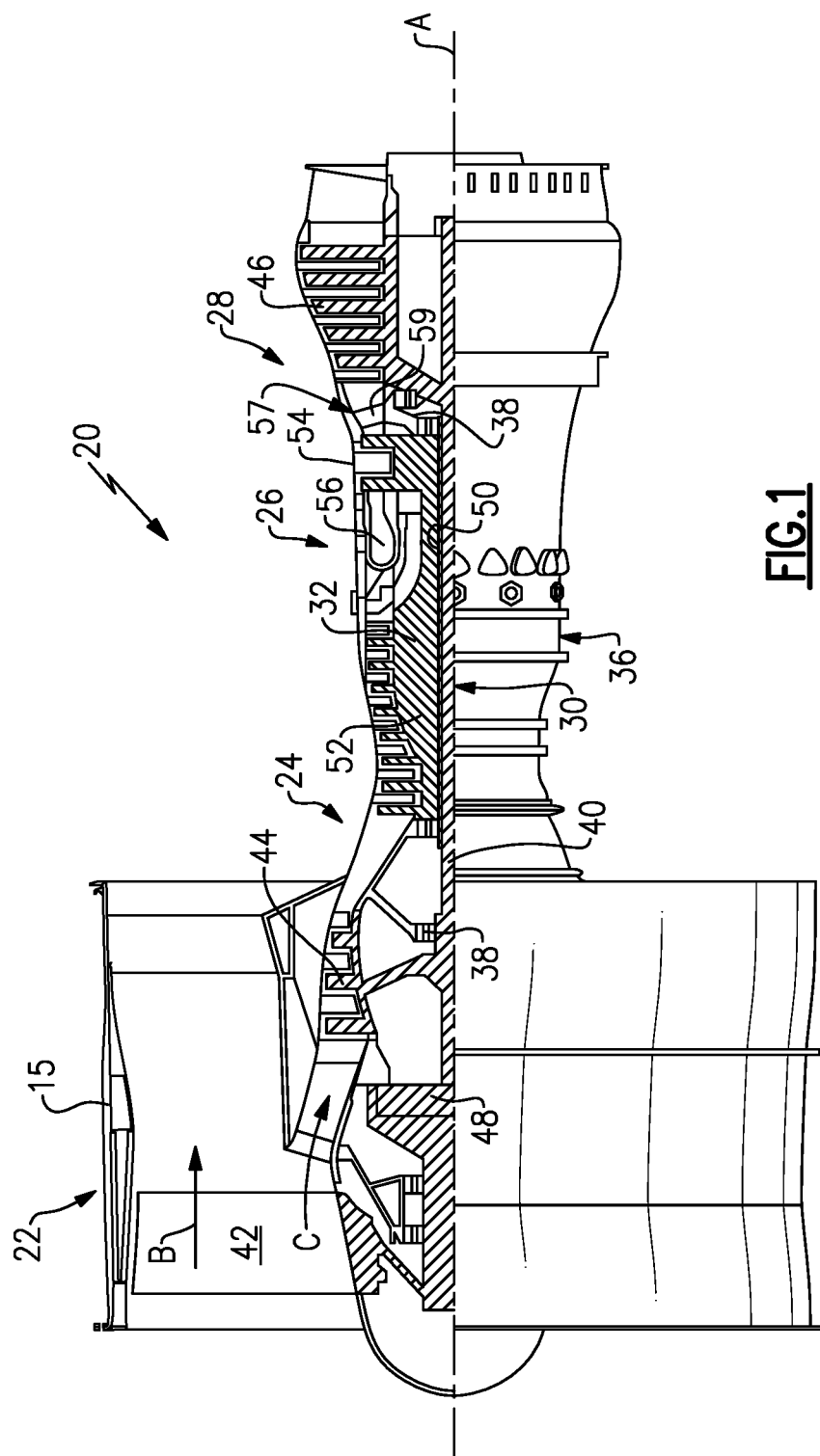
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }^\circ \text{R})/(518.7^\circ \text{R})]^{0.5}$. The "Low corrected fan tip speed" as disclosed herein according to one non-limiting embodiment is less than about 1150 ft/second (350.5 meters/second).

FIG. 2 shows a turbine section 100. A blade 102 has a radially outer tip spaced at 103 from a blade outer air seal ("BOAS") 104. The BOAS 104 is shown to have axially spaced forward and aft portions 106 and 108, and a central web 99 between the portions 106 and 108. An attachment block 110 mounts the BOAS 104.

The attachment block 110 receives seals 112 to seal a chamber between a radially inner surface of the attachment block 110 and a radially outer surface 122 of the central web 99. Cooling air is directed in a passage 200 between legs 115 and 117 by a channel 118 and then through cooling holes 120 to impinge against the surface 122 along the web 99.

A channel 118 leads into the attachment block 110 and between a forward and aft end 115 and 117, respectively. Cooling air is supplied to passage 118. There are a plurality of impingement cooling holes 120 spaced from radially outer surface 122 of the BOAS 104.

As can be appreciated, the seals 112 ensure that air does not leak between portions 106 and 108 and 115 and 117, but rather is directed to cool the surface 122. Mount structure 98 is also shown, which is associated with static structure on the engine to provide a mount for capturing and holding the hooks or portions 114 and 116 of block 110. Note portions 106 and 108 are radially inward of hooks 114 and 116.

FIG. 3 is a circumferentially extending view of the FIG. 2 structure. As shown, the air passes through the impingement cooling holes 120 off of the surface 122 and passes into a circumferential gap 128 between adjacent ones 104A and 104B of the BOAS. It should be understood the BOAS are circumferentially spaced with the gaps 128 occurring periodically. Circumferential gaps 135 are formed between adjacent ones of the attachment blocks 110 and 136. A feather seal 134 extends across circumferential gap 135 between adjacent circumferential ends 130 of blocks 110 and 136.

The channel 118, as shown in FIG. 3, can be seen to have circumferentially extending fingers 132 extending in both circumferential directions from a central chamber 131. As can be appreciated from FIGS. 2 and 3, the impingement cooling of the BOAS 104 is along central web 99 between the circumferentially spaced portions 106 and 108.

As shown, outer spanning portions 199 of the BOAS 104A and 104B are positioned radially outwardly of support portions 197 at each circumferential end of the attachment blocks 110 and 136. The attachment blocks may be slid circumferentially into the position as illustrated.

FIG. 4 shows an inner face of the attachment block 110. The seals 112 can be seen as well as the feather seals 134. Cooling holes 120 extend circumferentially beyond the blocks 114/116.

While the inner surface of the attachment block 110 may be formed of a base metal of the attachment block, it can also be formed with a coating to facilitate its formation and operation.

Figure 5:
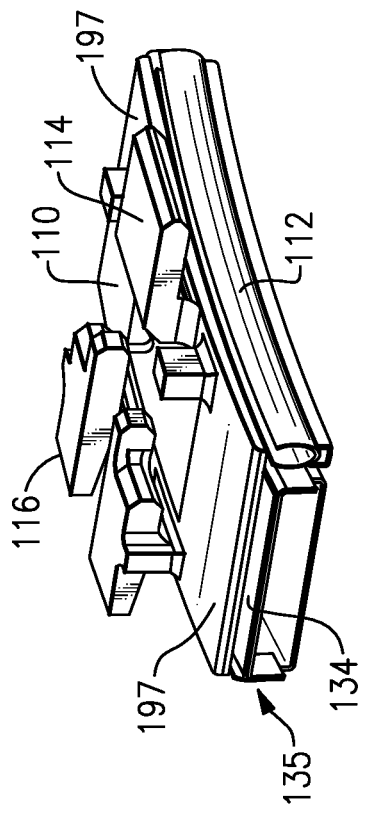
FIG. 5 shows the attachment block.

FIG. 5 shows that there is overlap across the gap 135 by the feather seals 134, and spanning circumferential gaps between the seals 112. The seals 112 may be associated with each attachment block 110. Alternating seals 112 may extend across multiple attachment blocks. Seals 112 may be C-shaped. The seals 112 may be alternative shapes, including W-shapes, a rope seal, or other shapes The combination of the seals 112 and 134 again ensure that the air directed into the chamber 97 be captured to cool the web 99 of the BOAS 104, and be constrained to flow outwardly through the gaps 128 rather than leaking elsewhere.

The BOAS, as disclosed in this application, may be formed of ceramic matrix composite materials. The attachment block, as disclosed in this application, has particular benefits when utilized with the BOAS formed of such material. In some applications it may be desirable to include a CMC compatible material on the attachment block at locations which will interface or be closely spaced from the BOAS, assuming the BOAS is formed of such material.

Figure 6:
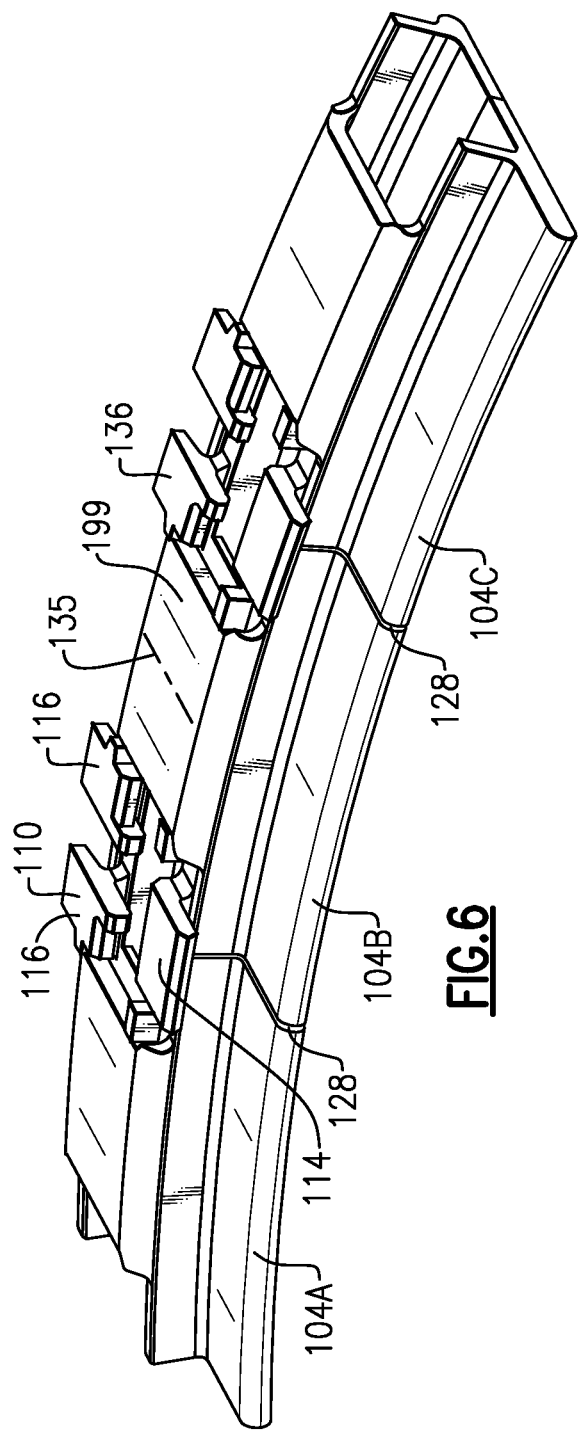
FIG. 6 is an assembly view.

FIG. 6 shows adjacent BOAS 104A, 104B, and 104C and intermediate circumferential gaps 128. The axially extending hook portions 114 and 116 of adjacent attachment blocks 110 and 136 are also shown. A single forward hook 114 and a plurality of aft hooks 116 are shown. As an alternative there could be a plurality of forward hooks 114 and a single aft hook 116. As also shown in phantom, the gaps 135 between the attachment blocks 110 and 136 are radially within outer mount structure 199, which is part of the BOAS.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a compressor section and a turbine section;
said turbine section including at least one turbine rotor having a plurality of radially extending turbine blades, and said turbine section being rotatable about an axis of rotation, and a plurality of blade outer air seals positioned radially outwardly of radially outer tips of said plurality of radially extending turbine blades, said blade outer air seals having axially spaced forward and aft portions and a central web between said axially spaced forward and aft portions;
a plurality of attachment blocks supported on structure within said gas turbine engine, and said attachment blocks mounting said plurality of blade outer air seals, and a passage extending into a central chamber within each said attachment block, and communicating with cooling holes through a radially inner face of each said attachment block to direct cooling air at said central web of each said blade outer air seal;
wherein said plurality of blade outer air seals being circumferentially spaced, and said plurality of attachment blocks being circumferentially spaced, and said attachment blocks spanning a circumferential gap between adjacent ones of said plurality of said blade outer air seals, with said cooling air moving from said central chamber in opposed circumferential directions to cool said central web of each of said adjacent blade outer air seals; and
wherein said central chamber including circumferentially extending fingers communicating with said passage, such that cooling air may pass into said passage, and then circumferentially into said circumferentially extending fingers, and then through said cooling holes to impinge on said central web.

2. The gas turbine engine as set forth in claim 1, wherein said cooling air, after having been directed at said central web of said blade outer air seal, passing radially inwardly through circumferential gaps between adjacent ones of said blade outer air seals.

3. The gas turbine engine as set forth in claim 2, wherein said attachment blocks have circumferential edges, and a gap seal spanning a circumferential gap between said circumferential edges of adjacent said attachment blocks.

4. The gas turbine engine as set forth in claim 3, wherein said gap seal spanning said circumferential gap between adjacent said attachment blocks is a feather seal.

5. The gas turbine engine as set forth in claim 1, wherein there are axial seals associated with a forward end and an aft end of said attachment block, and sealing against a forward and aft surface of said blade outer air seal.

6. The gas turbine engine as set forth in claim 5, wherein said axial seals at said forward and aft end of said attachment block are generally C-shaped.

7. The gas turbine engine as set forth in claim 1, wherein said cooling holes also being formed at locations circumferentially outwardly of hook portions on said attachment blocks, said hook portions include at least one forward attachment hook and at least one aft attachment hook, and said cooling holes being formed at locations circumferentially outward of both said at least one forward attachment hook and said at least one aft attachment hook.

8. The gas turbine engine as set forth in claim 7, wherein said hook portions include a single forward attachment hook and a plurality of aft attachment hooks.

9. A blade outer air seal assembly comprising:
- a blade outer air seal having axially spaced forward and aft portions and a central web between said axially spaced forward and aft portions;
- an attachment block to be supported on structure within an engine, and said attachment block mounting said blade outer air seal, and a passage extending into a central chamber within said attachment block, and communicating with cooling holes through a radially inner face of said attachment block to direct cooling air at said central web of said blade outer air seal; and
- wherein said central chamber including circumferentially extending fingers communicating with said passage, such that said cooling air may pass into said passage, and then circumferentially into said circumferentially extending fingers, and then through said cooling holes to impinge on said central web.

10. The blade outer air seal assembly as set forth in claim 9, wherein there are a plurality of circumferentially spaced blade outer air seals and a plurality of circumferentially spaced attachment blocks.

11. The blade outer air seal assembly as set forth in claim 10, wherein said cooling air, after having been directed at said central web of said blade outer air seal, passing radially inwardly through circumferential gaps between adjacent said blade outer air seals.

12. The blade outer air seal assembly as set forth in claim 11, wherein said attachment blocks have circumferential edges, and a gap seal spanning a circumferential gap between said circumferential edges of adjacent said attachment blocks.

13. The blade outer air seal assembly as set forth in claim 9, wherein there are axial seals associated with a forward end and an aft end of said attachment block, and sealing against a forward and aft surface of said blade outer air seal.

14. The blade outer air seal assembly as set forth in claim 13, wherein said axial seals at said forward and aft end of said attachment block are generally C-shaped.

15. The blade outer air seal assembly as set forth in claim 14, wherein said gap seals spanning said circumferential gap between adjacent said attachment blocks are feather seals.

\* \* \* \* \*